J. S. BROWN.
Bee-Hive.
No. 15,457.
Patented July 29, 1856.
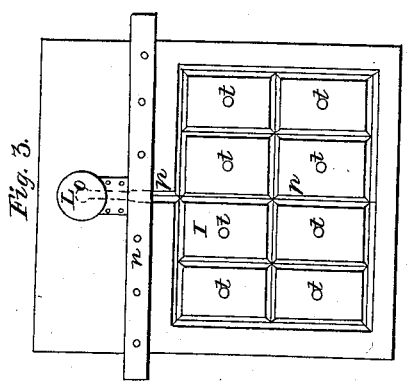
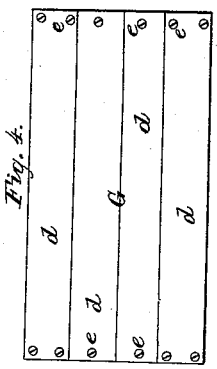
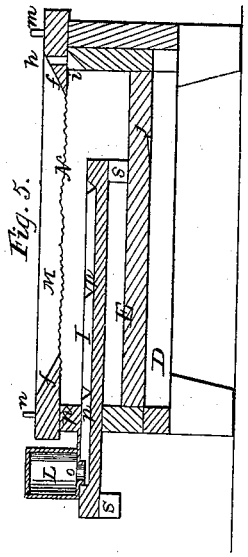
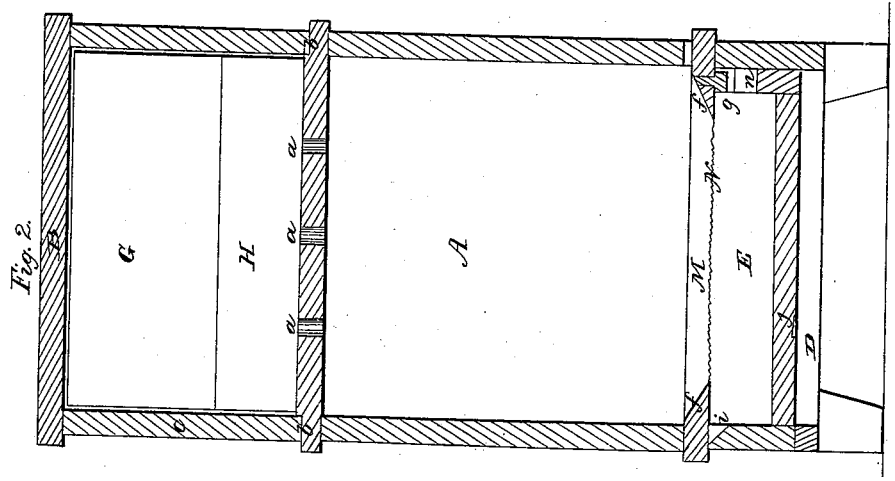
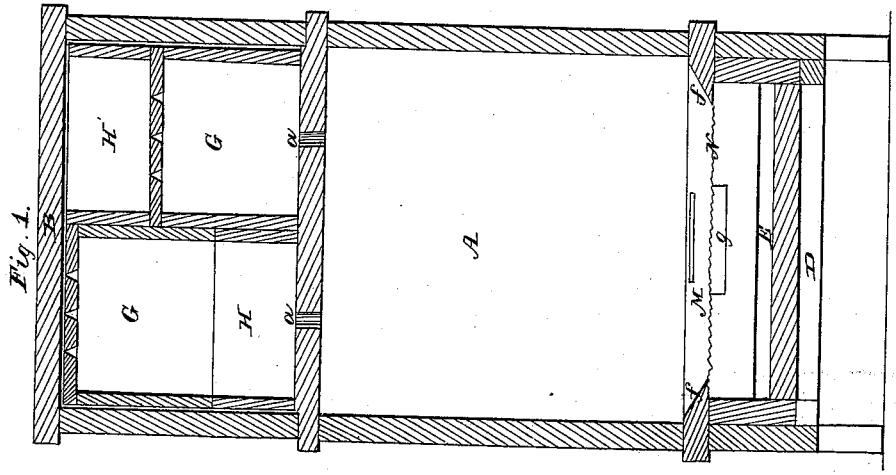

UNITED STATES PATENT OFFICE.

J. S. BROWN, OF WASHINGTON, DISTRICT OF COLUMBIA, ASSIGNOR TO JOSEPH KENT, OF BALTIMORE COUNTY, MARYLAND.

BEEHIVE.

Specification of Letters Patent No. 15,457, dated July 29, 1856.

*To all whom it may concern:*

Be it known that I, J. S. BROWN, of Washington, in the District of Columbia, have invented a new and Improved Beehive; and I do hereby declare that the following is a full and exact description thereof, reference being had to the accompanying drawings, making part of this specification, Figures 1 and 2 being vertical sections at right angles to each other of the hive; Fig. 3, a top view of the feeding apparatus; Fig. 4, a top view of one of the honey-boxes; Fig. 5, a vertical section of the hive-basement, showing the feeding apparatus in place.

Like letters designate corresponding parts in all the figures.

The brood box A, should be twelve and a half inches inside in each direction, or thereabout. The top is rabbeted entirely around its upper edge, to the depth, say of ¼ of an inch, as shown at $b$, Figs. 1, and 2, and is provided with some eight or ten holes $a\ a$, each about one inch in diameter; and arranged at such distances as will generally enable the bees to pass up from either of the spaces between the combs.

The honey-box chamber B, is made to fit around the raised inner portion of the cover of the brood box, as represented, so that both light and water will be excluded. Its height may be about eight inches inside, and its horizontal area equal to that of the brood box. One side $c$, is hinged so that it may be opened without being lifted off from the brood box.

The honey-boxes G, G, are made only about five inches in height, leaving a space above them ordinarily about three inches in height. Side extensions H, H′, are to be used for the purpose of increasing the capacity of the honey boxes, as often as the latter have been filled with honey. If the honey boxes were of the full height at first, the bees would often hesitate to commence filling, and in many instances would not attempt it. But if low boxes are first offered them, they readily commence working therein. As soon as these low boxes are filled, they are raised up and the side extensions inserted beneath them as seen at H, Figs. 1, and 2. Before the boxes are filled, said side extensions may occupy the space above the honey boxes, as seen at H′, Fig. 1. By thus raising the filled boxes, and offering more room for the bees to work in, they will continue their labors; whereas if the boxes had been removed and empty ones substituted, they would generally cease their labors for the season. By this means an additional quantity of honey can be obtained.

Another feature of the honey boxes G, G, consists in covering the tops with removable slats $d\ d$, each of such a width as to equal the ordinary thickness of comb. So, when the boxes are first put on the hive, a small piece of comb is to be affixed to the middle of each removable slat, for the purpose of directing the bees in starting the combs, so as to have a single sheet run lengthwise of each slat. Hence when it is desired to remove a quantity of honey, one of these slats is removed, and after taking off the sheet of comb and honey, again put in its place. The bees will at once proceed to replace the lost sheet of comb and honey. In order to render the slats readily removable, screws $e\ e$, (Fig. 4,) or any other convenient means, may be employed to keep them in place. These removable slats are to be distinguished from cross-bars, of some other hives, which consist in having spaces between strips on the top of brood-boxes, in order solely to induce bees to build their brood combs regularly, and are not removable. My improvement relates only to honey boxes, and is for an entirely different purpose.

The hive basement D, is covered with a board M which has its middle part cut away and covered on its under side with wire cloth N, as coarse as may be and not admit the bee-moth. The margins $f, f$, of the board aperture slope, or incline, from the inner sides of the brood box, down to the wire cloth, substantially as shown in the drawings, so that there is sufficient surface on the board for the bees to travel on, while all the filth which falls from above, either passes directly through the wire cloth, or first rolls down said margins, and then escapes through the wire cloth. The hive is thus kept clean and any desired amount of ventilation afforded. Beneath said board M, a drawer E, is inserted, the basement D being so constructed, as to inclose it on all sides except the one in which it is inserted. The inner end $n$ (Fig. 2,) does not reach up to the board M; so that by pulling out the drawer more or less, any desired amount of draft, and consequent ventilation, may be obtained, or the air may be entirely excluded from the bottom of the brood-box, or hive. This drawer serves also the double purpose of collecting the filth falling from the brood box, and of a moth-trap, as the bee-moths naturally deposit their eggs in the collected filth. It also serves another purpose which is about to be described.

A feeding apparatus of peculiar character is employed. It consists of a simple piece of board I, about an inch in thickness, of just sufficient width to be slid into the drawer E, and as long as may be desirable to feed the bees above. Near one end, a hole, or depression, say a third or a quarter of an inch in depth is made for the reception of the projecting mouth o, of a feed can L, as represented in Fig. 5. From this hole, a groove or channel p of the same depth extends and branches over the surface, in a manner similar to that represented in Fig. 3, the precise size, direction and number being immaterial. On the top of the board a cross cleat r, is secured, and projects substantially as shown in the drawings, in order to prevent the board being shoved in so far as to upset the feed can L, and also to completely shut the drawer from outside intruders. There are also cross cleats s s on the bottom of the board for the purpose of keeping it level when the apparatus is used in the drawer, and of raising it above the board on which it rests, when it is employed for feeding in the honey-box chamber. Also to facilitate the passage of the bees up from the brood-box, in the latter case, holes t, t, (Fig. 3,) may be made through it. When used for feeding below, the drawer E, is withdrawn and inserted, the outer end foremost, as represented in Fig. 5, after having removed a plug g (Figs. 1, and 2,) so as to open a passage h, (Fig. 5,) to allow the bees to descend into the drawer. If the end of the drawer would otherwise obstruct this passage, a notch i, is cut away to open the passage. The feeding apparatus is then shoved into the drawer as far as it will go, through the space left above the low end n thereof; and the can L, which contains the liquid bee food, is then inserted over the hole at the end of the groove p, as represented in Fig. 5. The result is, that the liquid flows from the can and fills all the branches of said groove up to the height of the bottom of the mouth o, and no higher. Said mouth should not reach to the bottom of the hole and groove. The bees come down and, standing on the board, feed upon the food, which is replenished from the can as fast as they lower it, without the danger of becoming mired therein. When they have taken enough, the can may be removed, and if still containing food, its mouth may be stopped, thus serving also for holding the food until the next time of feeding. As any projections from either side or end of the drawer E, would interfere with its use, a notch j may be cut in the bottom to take hold by, for the purpose of pulling the drawer out.

What I claim as my invention and desire to secure by Letters Patent, is—

The peculiar construction of the drawer E, and its arrangement in combination with the basement D, and bottom M, of the hive, substantially as herein set forth, so as to be reversible in position, and to serve the several purposes of a controllable ventilator, filth receptacle, moth trap, and feeding chamber, in the manner specified.

J. S. BROWN.

Witnesses:
 Geo. W. Adams,
 R. T. Osgood.